United States Patent Office 3,383,380
Patented May 14, 1968

3,383,380
CARBOXIMIDO CATIONIC AZO DYESTUFFS
James M. Straley and John G. Fisher, Kingsport, Tenn., assignors to Eastman Kodak Company, Rochester, N.Y., a corporation of New Jersey
No Drawing. Filed May 24, 1965, Ser. No. 458,385
11 Claims. (Cl. 260—158)

ABSTRACT OF THE DISCLOSURE

Thiazolyl-azo-aniline and benzothiazolyl - azo - aniline compounds containing a dicarboximidoalkyl group attached to the aniline nitrogen atom and in which the ring nitrogen atom of the thiazolyl and benzothiazolyl groups is quaternized are useful as dyes for acrylonitrile polymer textile materials.

---

This invention relates to novel quaternized azo compounds containing a dicarboximido radical, particularly useful as dyestuffs.

The azo compounds have the general formula

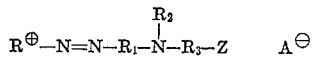

wherein $R^\oplus$ represents a quaternized monocyclic 2-thiazolyl radical, that is, a radical having the general formula

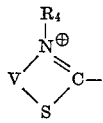

in which V is vinylene e.g., —C=CH—, or vinylene substituted with nitro, e.g. —C(NO$_2$)=CH—, lower alkyl, lower alkanoyl, e.g., —C(CH$_3$)=C(COCH$_3$)— cyano, thiocyano, trifluoromethyl, lower alkanoylamido, lower alkylsulfonyl, bromine, lower carboalkoxy, or phenyl; and R$_4$ is lower alkyl or benzyl; or $R^\oplus$ represents a quaternized 2-benzothiazolyl radical having the general formula

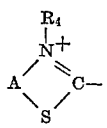

in which Ar is o-phenylene or o-phenylene substituted with lower alkyl, lower alkoxy, lower alkanoyl, lower alkanoylamido, halogen, thiocyano, lower alkylthio, lower carboalkoxy, sulfonamido, lower N - alkylsulfonamido, lower N,N-dialkylsulfonamido, lower alkylsulfonyl, cyano, lower alkylamino, lower dialkylamino, arylamino, etc., and R$_4$ is lower alkyl or benzyl;

R$_1$=a phenylene radical derived from an aminoalkylaniline coupling component, e.g., p-phenylene and p-phenylene substituted with lower alkyl, lower alkoxy, or halogen such as m-tolylene, o-tolylene, chloro-p-phenylene, dimethoxy-p-phenylene, dichloro-p-phenylene, methoxy-p-phenylene, etc., R$_2$=hydrogen or an alkyl radical including straight and branch-chained lower alkyl groups, e.g., methyl, ethyl, propyl, iso-propyl, butyl, iso-butyl and substituted alkyl such as hydroxyalkyl, e.g., hydroxyethyl; cyanoalkyl, e.g., cyanoethyl; lower alkoxyalkyl, e.g., methoxyethyl; aryloxyalkyl, e.g., phenoxyethyl; lower alkanoxyloxy, haloalkyl, and phenyl, R$_3$=an alkylene radical straight or branch-chained, particularly lower alkylene, such as —(CH$_2$)$_n$— wherein $n$ is a positive integer from 1 to 4, Z=a dicarboximido radical such as phthalimido, succinimido, maleimido, citraconimido, etc., as indicated in the tables below derived from the corresponding anhydride, $A^\ominus$=an anion, e.g., $Cl^\ominus$, $Br^\ominus$, $CH_3SO_4^\ominus$

$HSO_4^\ominus$, $H_2PO_4^\ominus$, $ZnCl_3^\ominus$, $ZnBr_3^\ominus$, derived from quaternization of the azo compounds.

The substituents attached to the various radicals mentioned can be expected to function primarily as auxochrome groups to vary the color and other properties of the azo compounds but do not adversely affect the utility of the azo compounds especially when they are used as textile dyes.

The quaternized azo compounds of the invention are water-soluble and particularly useful as dyes for acrylonitrile polymer fibers, yarns and fabrics producing a variety of fast shades on these fibers. In general the dyes have good fastness, for example, to light, washing, gas (atmospheric fumes) and sublimation. The quaternized azo compounds are similar in structure to the non-quaternized azo compounds disclosed in U.S. Patents 3,148,180 and 3,161,631. However, when the non-quaternized azo compounds of these patents are used for dyeing acrylonitrile polymer textile materials, the colors obtained do not have as good fastness to light nor is wet-fastness such as fastness to washing and alkaline perspiration as good.

The quaternized compounds of the invention can be prepared by coupling diazotized 2-aminothiazoles or 2-aminobenzothiazoles with the dicarboximidoalkylaniline coupling components such as N-[2(N-ethyl-m-toluidine) ethyl]phthalimide having the general formula

II

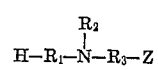

wherein R$_1$, R$_2$, R$_3$ and Z have the same meaning as given above and R$_1$ is not substituted in the diazo coupling position. The resultant azo compound is then quaternized, as described in the examples, to obtain the quaternized thiazolium azo compounds of the invention.

The dicarboximido radical Z has the general formula

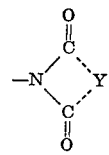

wherein Y represents ethylene, propylene, vinylene, methylvinylene, 1,2-cyclohexylene, bicyclo[2.2.1]-5-heptene-2,3-ylene, o-phenylene, nitro-o-phenylene, chloro-o-phenylene, —NHCH$_2$—, —CH$_2$OCH$_2$—, —CH$_2$NHCH$_2$—, or —NHCH$_2$CH$_2$—.

The synthesis of representative 5- and 6-membered cyclic dicarboximidoalkyl aniline coupling components of Formula II in which Y is a chain of carbon atoms, is described in U.S. Patent 3,161,631, e.g., N-[2(N-ethyl-m-toluidine)ethyl]phthalimide,
N-[2(N-ethylanilino)ethyl]succinimide,
N-[2-(N-ethyl-m-toluidine)-ethyl]tetrachlorophthalimide,
N-[2-(N-butyl-m-toluidine)ethyl]-succinimide,
N-[2(N-ethyl-m-toluidine)ethyl]bicyclo[2.2.1]-5-heptene-2,3-dicarboximide,
N-[2(N-ethylanilino)propyl]succinimide,
N-[2(N-ethyl-m-toluidine)ethyl]cyclohexane-1,2-dicarboximide,
N-[2(N-ethyl-m-toluidine)ethyl]citraconimide,
N-β-glutarimidoethyl-N-ethyl-m-toluidine,
N-ethyl-N-succinimidomethylaniline,
N-α-chloro-β-hydroxypropyl-N-β-succinimidoethyl-m-toluidine,
N-β-acetoxyethyl-N-β-succinimidoethyl-m-toluidine,
N-ethyl-N-phthalimidomethyl-m-toluidine.

The preparation of compounds of Formula II above in which Z is a dicarboximido radical the ring of which contains a chain of at least one atom other than carbon, e.g., oxygen, nitrogen and sulfur, is described in Weaver et al., U.S. patent application Ser. No. 394,304 filed Sept. 3, 1964.

Representative of these coupling components are 3-[2-(N-ethyl-m-toluidino)ethyl]hydantoin

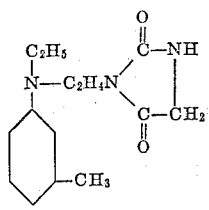

as well as 4-[2-(N-ethyl-m-toluidino)ethyl]3,5-morpholinedione, 1 - [2-(N-ethyl-m-toluidino)ethyl]-2,5-piperazinedione and 3 - [2-(N-ethyl-m-toluidino)ethyl]2,4-thiazolidinedione. These coupling components are coupled with aminothiazoles or aminobenzothiazoles followed by quaternization.

The quaternization of the azo compounds obtained by coupling the aminothiazoles and aminobenzothiazoles with the dicarboximidoalkyl aniline coupling components may be carried out in a well-known manner illustrated in the examples below in an inert solvent using the known quaternizing agents. A dialkyl sulfate, an alkyl chloride, an alkyl bromide, an alkyl iodide, an aralkyl chloride, an aralkyl bromide or an alkyl ester of paratoluene sulfonic acid, for example, can be employed. Specific quaternizing agents include, for example, dimethyl sulfate, diethyl sulfate, dipropyl sulfate, dibutyl sulfate, ethyl bromide, ethyl chloride, methyl iodide, ethyl iodide, n-butyl iodide, lauryl iodide, benzyl chloride, benzyl bromide, methyl p-toluene sulfonate, ethyl p-toluene sulfonate, n-propyl p-toluene sulfonate and n-butyl p-toluene sulfonate.

The following examples will serve to illustrate the preparation of representative azo compounds of our invention.

EXAMPLE 1

1.0 g. of the azo dye from diazotized 2-amino-4-methyl-thiazole coupled to N-β-succinimidoethyl-N-ethyl-m-toluidine (N-[2(N-ethyl-m-toluidine)ethyl]succinimide) was heated in 10 ml. of dimethyl sulfate in the steam bath for 30 minutes. The solution was drowned in hexane to give a gummy product. The hexane was decanted and the residue dissolved in 400 ml. of water by warming. Charcoal was added and the violet solution filtered. The dye was precipitated by the addition of NaCl and ZnCl₂ and is water soluble. It dyes acrylic fibers in violet shades. The formula of the dye is

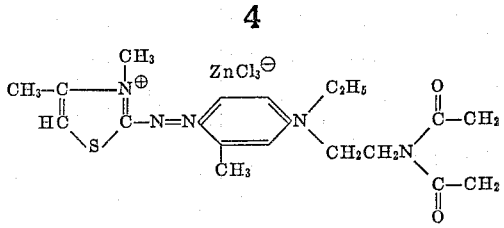

EXAMPLE 2

0.5 g. of the azo dye from 2-amino-6-methoxybenzothiazole and N-β-phthalimidoethyl-N-ethyl-m-toluidine was heated in 30 ml. of acetonitrile with 1 ml. of methyliodide for 2.5 hours. The reaction mixture was cooled in an ice bath to 5° C. and the precipitated quaternary iodide was filtered off, washed with hexane and dried at room temperature. This dye imparts fast greenish blue shades to acrylic fibers. It has the formula

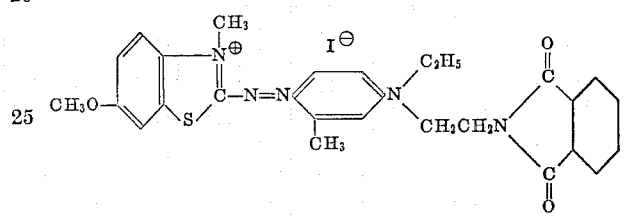

EXAMPLE 3

0.5 g. of the azo dye from 2-amino-4-phenyl-5-thiocyanothiazole and N,β-succinimidoethyl-N,β-cyanoethyl-m-toluidine was heated at the boil in 40 ml. of chlorobenzene for about 2 minutes. It was then filtered into a flask containing .5 ml. of dimethylsulfate and the quaternization carried out by heating on the steam bath with stirring for 3.5 hours. After cooling, the quaternized dye was collected on a filter, rinsed with hexane and dried in a vacuum desiccator. It imparts fast red-violet shades to acrylic fibers. This dye has the structure:

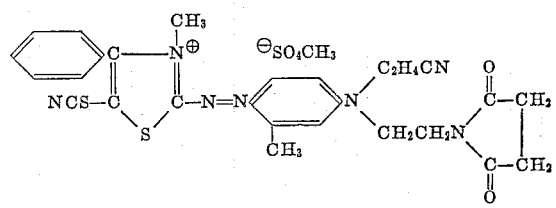

EXAMPLE 4

2.0 g. of the dye from 2-amino-6-β-hydroxyethylbenzothiazole and N,β - bicyclo[2.2.1] - 5 - heptene - 2,3 - dicarboximidoethyl - N - ethyl - m - toluidine were heated in a tube with 15 ml. of methyl-p-toluene-sulfonate at 95 to 100° C. for three hours. The reaction mixture was drowned in 250 ml. of chlorobenzene and the quaternized dye collected on a filter, washed with hexane, then with ether. It was dried in a vacuum. This dye imparts fast blue shades to acrylic fibers and has the following structure:

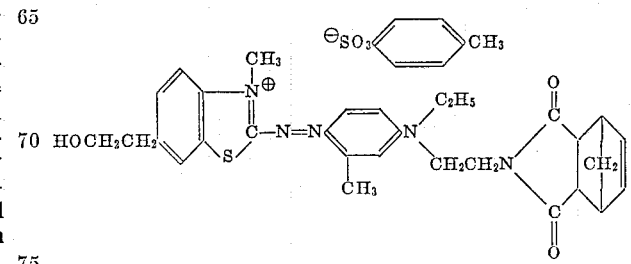

EXAMPLE 5

.25 g. of the dye from 2 - amino - 4 - methyl - 5 - acetylthiazole and N,β - maleimidoethyl - N - ethyl - m - toluidine were heated in 5 ml. of dimethyl sulfate at 95 to 100° C. for 1.5 hours. The violet solution was drowned in ether to give a slightly sticky product. After decanting the ether and rinsing once with a small portion of ether the residue was dissolved in 350 ml. of water by heating. Charcoal was added and the solution filtered. After allowing to cool, the dye was precipitated by addition of NaI. It dyes acrylic fibers in fast reddish violet shades and has the structure:

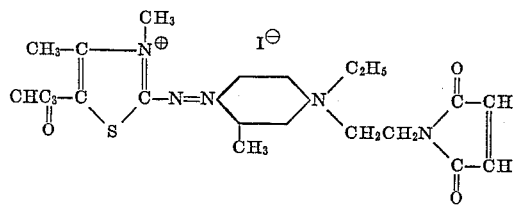

EXAMPLE 6

1.0 g. of the dye from 2-amino-4,5-dimethylthiazole and N,β - succinimido ethyl - N - ethyl - m toluidine was heated in 15 ml. of benzyl chloride on the steam bath for 20 hours. The reaction mixture was cooled, filtered and the solid dyestuff washed with ether. It was dried in a vacuum. It dyes acrylic fibers in violet shades which exhibit good fastness properties. This dye has the structure:

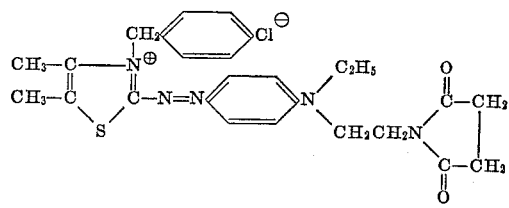

EXAMPLE 6A

The following compound described in Example 1 of U.S. Ser. No. 394,304.

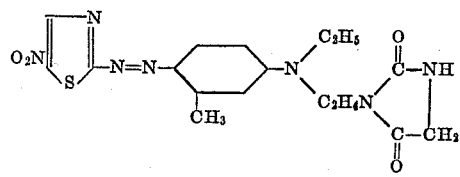

is quaternized and isolated in the manner described in Example 1 above to obtain the compound

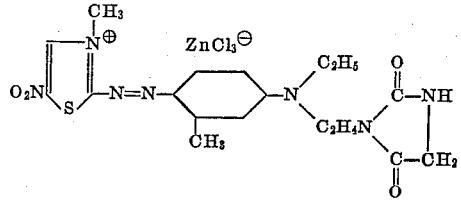

The azo compounds having the Formula III

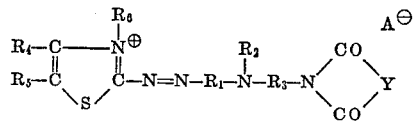

described in the following tables are prepared in the manner of the above examples by coupling the indicated aminothiazole or aminobenzothiazole with the indicated coupling component followed by quaternization with the compound providing the anion $A^\ominus$. The color shown is for dyeings made on an acrylonitrile copolymer textile material. Thus, in Example 7, 2-aminothiazole is coupled with

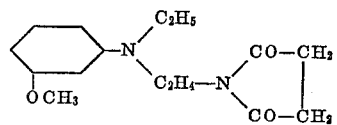

quaternized with dimethyl sulfate and isolated with NaCl and $ZnCl_2$ as in Example 1 to obtain a compound having the structure shown in Example 1 except the coupler radical contains the $OCH_3$ group rather than the $CH_3$ group.

TABLE I.—AZO COMPOUNDS FROM 2-AMINOTHIAZOLES

| Example | $R_4$ | $R_5$ | $R_6$ | $A^\ominus$ | $R_1$ | $R_2$ | $R_3$ | Y | Color |
|---|---|---|---|---|---|---|---|---|---|
| 7 | H | H | $CH_3$ | $ZnCl_3$ | –⟨phenyl-OCH_3⟩– | $C_2H_5$ | $-C_2H_4-$ | $-C_2H_4-$ | Violet. |
| 8 | H | H | $CH_3$ | $CH_3SO_4$ | –⟨phenyl⟩– | ⟨phenyl⟩ | $-C_3H_6-$ | $-C_2H_4-$ | Blue-violet. |
| 9 | H | H | $CH_3$ | I | –⟨phenyl-(OCH_3)_2⟩– | ⟨phenyl⟩ | $-C_3H_6-$ | $-C_2H_4-$ | Violet. |
| 10 | H | H | $CH_3$ | I | –⟨phenyl-Cl⟩– | ⟨phenyl⟩ | $-C_3H_6-$ | $-C_2H_4-$ | Do. |
| 11 | H | H | $CH_3$ | I | –⟨phenyl-CH_3⟩– | ⟨phenyl⟩ | $-C_3H_6-$ | ⟨phenyl⟩ | Do. |
| 12 | H | H | $CH_3$ | $CH_3SO_4$ | –⟨phenyl-CH_3⟩– | ⟨phenyl⟩ | $-C_3H_6-$ | ⟨phenyl-Cl_3⟩ | Do. |

TABLE I.—AZO COMPOUNDS FROM 2-AMINOTHIAZOLES—Continued

| Example | $R_4$ | $R_5$ | $R_6$ | $A^\ominus$ | $R_1$ | $R_2$ | $R_3$ | Y | Color |
|---|---|---|---|---|---|---|---|---|---|
| 13 | H | H | $CH_3$ | $CH_3SO_4$ | 4-$CH_3$-$C_6H_4$- | $C_6H_5$- | -$C_3H_6$- | 4-$NO_2$-$C_6H_4$- | Do. |
| 14 | H | H | $CH_3$ | $CH_3SO_4$ | 4-$CH_3$-$C_6H_4$- | $C_2H_4OH$ | -$C_3H_6$- | tetrachlorophenyl | Do. |
| 15 | H | H | $CH_3$ | $SO_4CH_3$ | 4-$CH_3$-$C_6H_4$- | $C_2H_4CN$ | -$CH_2CH_2CH_2$- | cyclohexyl | Do. |
| 16 | H | H | $CH_3$ | I | 4-$CH_3$-$C_6H_4$- | $CH_3$ | -$CH(CH_3)CH_2CH_2$- | -$CH=C(CH_3)$- | Do. |
| 17 | H | H | $CH_3$ | $SO_4CH_3$ | 4-$CH_3$-$C_6H_4$- | $C_2H_5$ | -$C_2H_4$- | cycloheptatrienyl | Do. |
| 18 | $CH_3$ | H | $CH_3$ | I | 4-$CH_3$-$C_6H_4$- | $C_2H_5$ | -$C_2H_4$- | -$CH=CH$- | Do. |
| 19 | $CH_3$ | H | $CH_3$ | $CH_3SO_4$ | 4-$CH_3$-$C_6H_4$- | $C_2H_5$ | -$C_2H_4$- | $C_6H_4$ | Do. |
| 20 | $CH_3$ | H | $CH_3$ | $CH_3SO_4$ | 2-$CH_3$-$C_6H_4$- | $C_2H_5$ | -$C_2H_4$- | trichlorophenyl | Do. |
| 21 | $CF_3$ | H | $CH_3$ | I | 2-$CH_3$-$C_6H_4$- | $C_2H_5$ | -$C_2H_4$- | -$CH_2CH_2$- | Red-violet. |
| 22 | H | $CH_3CO$- | $CH_3$ | I | 2-$CH_3$-$C_6H_4$- | $C_2H_5$ | -$C_2H_4$- | -$CH_2CH_2$- | Do. |
| 23 | $C_6H_5$- | H | $CH_3$ | I | 2-$CH_3$-$C_6H_4$- | $C_2H_5$ | -$C_2H_4$- | -$CH_2CH_2$- | Violet. |
| 24 | H | $NO_2$ | $CH_3$ | I | 2-$CH_3$-$C_6H_4$- | $C_2H_5$ | -$C_2H_4$- | -$CH_2CH_2$- | Blue-violet. |
| 25 | H | CN | $CH_3$ | I | 2-$CH_3$-$C_6H_4$- | $C_2H_5$ | -$C_2H_4$- | -$CH_2CH_2$- | Do. |
| 26 | H | $C_4H_9SO_2$ | $CH_3$ | I | 2-$CH_3$-$C_6H_4$- | $C_2H_5$ | -$C_2H_4$- | -$CH_2CH_2$- | Do. |
| 27 | $CH_3CONH$- | H | $CH_3$ | $CH_3SO_4$ | 2-$CH_3$-$C_6H_4$- | $C_2H_5$ | -$C_2H_4$- | -$CH_2CH_2$- | Do. |
| 28 | $CO_2C_2H_5$ | H | $CH_3$ | $CH_3SO_4$ | 2-$CH_3$-$C_6H_4$- | $C_2H_5$ | -$C_2H_4$- | -$CH_2CH_2$- | Do. |

TABLE I.—AZO COMPOUNDS FROM 2-AMINOTHIAZOLES—Continued

| Example | $R_4$ | $R_5$ | $R_6$ | $A^\ominus$ | $R_1$ | $R_2$ | $R_3$ | Y | Color |
|---|---|---|---|---|---|---|---|---|---|
| 29 | H | Br | $CH_3$ | I | (phenyl with $CH_3$) | $C_2H_5$ | $-C_2H_4-$ | $-CH_2CH_2-$ | Do. |
| 29a | H | H | $CH_3$ | $CH_3SO_4$ | (phenyl with $CH_3$) | $C_2H_5$ | $-C_2H_4-$ | $-CH_2OCH_2-$ | Do. |
| 29b | H | H | $CH_3$ | $CH_3SO_4$ | (phenyl with $CH_3$) | $C_2H_5$ | $-C_2H_4-$ | $-CH_2NHCH_2-$ | Do. |
| 29c | H | H | $CH_3$ | $CH_3SO_4$ | (phenyl with $CH_3$) | $C_2H_5$ | $-C_2H_4-$ | $-NHCH_2CH_2-$ | Do. |

TABLE II.—AZO COMPOUNDS FROM 2-AMINOBENZOTHIAZOLES

| Example | Substituents on Benzothiazole Ring | $R_6$ | $A^\ominus$ | $R_1$ | $R_2$ | $R_3$ | Y | Color |
|---|---|---|---|---|---|---|---|---|
| 30 | None | $CH_3$ | $CH_3SO_4$ | phenyl | $C_2H_5$ | $-C_2H_4-$ | $-C_2H_4-$ | Blue. |
| 31 | do | $CH_3$ | $CH_3SO_4$ | phenyl | phenyl | $-C_3H_6-$ | $-C_2H_4-$ | Greenish-blue. |
| 32 | do | $CH_3$ | $CH_3SO_4$ | phenyl-$CH_3$ | phenyl | $-C_3H_6-$ | $-C_2H_4-$ | Blue. |
| 33 | do | $CH_3$ | $CH_3SO_4$ | phenyl-Cl | phenyl | $-C_3H_6-$ | $-C_2H_4-$ | Do. |
| 34 | do | $CH_3$ | $CH_3SO_4$ | phenyl-$OCH_3$ | phenyl | $-C_3H_6-$ | $-C_2H_4-$ | Do. |
| 35 | do | $CH_3$ | $CH_3SO_4$ | phenyl-($OCH_3$)$_2$ | phenyl | $-C_3H_6-$ | $-C_2H_4-$ | Do. |
| 36 | do | $CH_3$ | $CH_3SO_4$ | phenyl-$CH_3$ | phenyl | $-C_3H_6-$ | $-CH=CH-$ | Do. |
| 37 | do | $CH_3$ | $CH_3SO_4$ | phenyl-$CH_3$ | $CH_3$ | $\underset{}{-\overset{CH_3}{C}HCH_2CH_2-}$ | $\underset{}{-\overset{CH_3}{C}=CH-}$ | Do. |
| 38 | do | $CH_3$ | $CH_3SO_4$ | phenyl-$CH_3$ | $C_2H_4CN$ | $-CH_2CH_2CH_2-$ | cyclohexyl | Do. |
| 39 | do | $CH_3$ | $CH_3SO_4$ | phenyl-$CH_3$ | $C_2H_4OCH_3$ | $-CH_2CH_2-$ | tetrachlorophenyl | Do. |
| 40 | do | $CH_3$ | $CH_3SO_4$ | phenyl-$CH_3$ | H | $-CH_2CH_2-$ | phenyl | Do. |
| 41 | do | $CH_3$ | $CH_3SO_4$ | phenyl-$CH_3$ | $C_2H_5$ | $-CH_2CH_2-$ | phenyl-$NO_2$ | Do. |

TABLE II.—AZO COMPOUNDS FROM 2-AMINOBENZOTHIAZOLES—Continued

| Example | Substituents on Benzothiazole Ring | R₆ | A⁻ | R₁ | R₂ | R₃ | Y | Color |
|---|---|---|---|---|---|---|---|---|
| 42 | do | CH₃ | CH₃SO₄ |  | C₂H₅ | —CH₂CH₂— |  | Do. |
| 43 | 4-CH₃ | CH₃ | CH₃SO₄ |  | C₂H₅ | —CH₂CH₂— | —CH₂—CH₂— | Do. |
| 44 | 4,6-diMe | CH₃ | CH₃SO₄ |  | C₂H₄OOCCH₃ | —CH₂CH₂— | —CH₂CH₂— | Do. |
| 45 | 4-CH₃O | CH₃ | CH₃SO₄ |  | C₂H₄COOCH₃ | —CH₂CH₂— | —CH₂CH₂— | Greenish-blue. |
| 46 | 4,7-diMeO | CH₃ | CH₃SO₄ |  | C₂H₅ | —CH₂CH₂— | —CH₂CH₂— | Do. |
| 47 | 6-MeO | CH₃ | CH₃SO₄ |  | C₂H₅ | —CH₂CH₂— | —CH₂CH₂— | Do. |
| 48 | 6-C₂H₅O | CH₃ | CH₃SO₄ |  | C₂H₅ | —CH₂CH₂— | —CH₂CH₂— | Do. |
| 49 | 4-HOC₂H₄— | CH₃ | CH₃SO₄ |  | C₂H₅ | —CH₂CH₂— | —CH₂CH₂— | Blue. |
| 50 | 6-CH₃S | CH₃ | CH₃SO₄ |  | C₂H₅ | —CH₂CH₂— | —CH₂CH₂— | Reddish-blue. |
| 51 | 6-C₂H₅S | CH₃ | CH₃SO₄ |  | C₂H₅ | —CH₂CH₂— | —CH₂CH₂— | Do. |
| 52 | 6-NCCH₂CH₂S— | CH₃ | CH₃SO₄ |  | C₂H₅ | —CH₂CH₂— | —CH₂CH₂— | Do. |
| 53 | 6-CH₃SO₂ | CH₃ | CH₃SO₄ |  | C₂H₅ | —CH₂CH₂— | —CH₂CH₂— | Violet. |
| 54 | 6-CN | CH₃ | CH₃SO₄ |  | C₂H₅ | —CH₂CH₂— | —CH₂CH₂— | Do. |
| 55 | 6-SO₂NH₂ | CH₃ | CH₃SO₄ |  | C₂H₅ | —CH₂CH₂— | —CH₂CH₂— | Reddish-blue. |
| 56 | 6-CO₂C₂H₅ | CH₃ | CH₃SO₄ |  | C₂H₅ | —CH₂CH₂— | —CH₂CH₂— | Do. |
| 57 | 6-CH₃CO | CH₃ | CH₃SO₄ |  | C₄H₉ | —CH₂CH₂— | —CH₂CH₂— | Do. |
| 58 | SCN | CH₃ | CH₃SO₄ |  | C₄H₉ | —CH₂CH₂— | —CH₂CH₂— | Violet. |

TABLE II.—COMPOUNDS FROM 2-AMINOBENZOTHIAZOLES—Continued

| Example | Substituents on Benzothiazole Ring | $R_6$ | $A^\ominus$ | $R_1$ | $R_2$ | $R_3$ | Y | Color |
|---|---|---|---|---|---|---|---|---|
| 59 | 6-$CONH_2$ | $CH_3$ | $CH_3SO_4$ | —⟨phenyl-$CH_3$⟩— | $C_2H_5$ | —$CH_2CH_2$— | —$CH_2CH_2$— | Reddish-blue. |
| 60 | 6-$CNCH_2CH_2SO_3$ | $CH_3$ | $CH_3SO_4$ | —⟨phenyl-$CH_3$⟩— | $C_2H_5$ | —$CH_2CH_2$— | —$CH_2CH_2$— | Violet. |
| 61 | 6-$SO_2N(CH_3)_2$ | $CH_3$ | $CH_3SO_4$ | —⟨phenyl-$CH_3$⟩— | $C_2H_5$ | —$CH_2CH_2$— | —$CH_2CH_2$— | Do. |
| 62 | 6-$CH_3CONH$— | $CH_3$ | $CH_3SO_4$ | —⟨phenyl-$CH_3$⟩— | $C_2H_5$ | —$CH_2CH_2$— | —$CH_2CH_2$— | Blue. |
| 63 | 6-Cl | $CH_3$ | $CH_3SO_4$ | —⟨phenyl-$CH_3$⟩— | $C_2H_5$ | —$CH_2CH_2$— | —$CH_2CH_2$— | Reddish-blue. |
| 64 | 6-$OCH_3$ | $CH_3$ | $CH_3SO_4$ | —⟨phenyl-$CH_3$⟩— | $C_2H_5$ | —$CH_2CH_2$— | —$CH_2CH_2$— | Violet. |
| 65 | 6-$OCH_3$ | $CH_3$ | $CH_3SO_4$ | —⟨phenyl-$CH_3$⟩— | $C_2H_5$ | —$CH_2CH_2$— | —$CH_2NHCH_2$— | Do. |
| 66 | 6-$OCH_3$ | $CH_3$ | $CH_3SO_4$ | —⟨phenyl-$CH_3$⟩— | $C_2H_5$ | —$CH_2CH_2$— | —$NHCH_2CH_2$— | Do. |

The acrylic polymer textile materials which can be dyed with the azo compounds include those polymers containing at least about 35% combined acrylonitrile units and up to about 95% acrylonitrile units, and modified, for example, by 85–5% of vinyl pyridine units as described in U.S. Patents 2,990,393 (Re. 25,533) and 3,014,008 (Re. 25,539) or modified by 65–5% of vinylpyrrolidone units, for example, as described by U.S. Patent 2,970,783, or modified with 65–5% acrylic ester or acrylamide units as described in U.S. Patents 2,879,253, 2,879,254 and 2,838,470. Similar amounts of the other polymeric modifiers mentioned above are also useful.

A preferred group of copolymers are the modacrylic polymers such as described in U.S. Patent 2,831,826 composed of a mixture of (A) 70–95% by weight of a copolymer of from 30 to 65% by weight of vinylidene chloride or vinyl chloride and 70–35% by weight of acrylonitrile, and (B) 30–5% by weight of a second polymer from the group consisting of (1) homopolymers of acrylamidic monomers of the formula

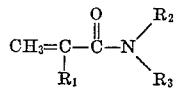

wherein $R_1$ is selected from the group consisting of hydrogen and methyl, and $R_2$ and $R_3$ are selected from the group consisting of hydrogen and alkyl groups of 1–6 carbon atoms, (2) copolymers consisting of at least two of said acrylamidic monomers, and (3) copolymers consisting of at least 50% by weight of at least one of said acrylamidic monomers and not more than 50% by weight of a polymerizable monovinyl pyridine monomer.

A particularly efficacious group of modacrylic polymers is an acetone soluble mixture of (A) 70–95% by weight of a copolymer of 30–65% by weight of vinylidene chloride and 70–35% by weight of acrylonitrile and (B) 30–5% by weight of an acrylamide homopolymer having the above formula wherein $R_1$, $R_2$ and $R_3$ are as described above. Specific polymers of that group contain 70–95% by weight of (A) a copolymer of from 30–65% by weight of vinylidene chloride and 70–35% by weight of acrylonitrile and (B) 30–5% by weight of a lower N - alkylacrylamide polymer such as poly-N-methylacrylamide, poly-N-isopropylacrylamide and poly-N-tertiarybutylacrylamide.

The following example illustrates one way in which the azo compounds of the invention can be used to dye acrylonitrile polymer textile material. .1 gram of dye is dissolved by warming in 5 cc. of methyl Cellosolve. A 2% aqueous solution of a non-ionic surfactant, such as Igepal CA (a polymerized ethylene oxide-alkylphenol condensation product), is added slowly until a fine emulsion is obtained and then the dye mixture is brought to a volume of 200 cc. with warm water. 5 cc. of a 5% aqueous solution of formic acid or acetic acid are added and then 10 grams of fabric made from an acrylic fiber is entered and in the case of Orlon 42 the dyeing is carried out at the boil for one hour. In the case of materials made of Verel acrylic fiber the dyebath temperature should not exceed 90° C. in order to avoid damage to the fiber. The dyed material is then washed well with water and dried.

The azo compounds can be used for dyeing these acrylic textile materials by well-known methods. For example, dyeings such as described in the above example are made by adding a suitable amount of the azo compound to hot water, adding about 5 cc. of 10% formic acid solution per 200 cc. of dye bath followed by adding the acrylic fabric, holding the bath at the boil for one hour and washing the fabric.

The invention has been described in considerable detail with particular reference to certain preferred embodiments thereof, but it will be understood that variations and modifications can be effected within the spirit and scope of the invention as described hereinabove, and as defined in the appended claims.

What we claim is:
1. A compound having the formula

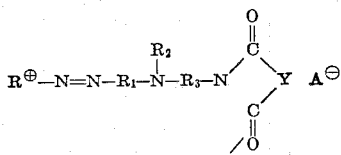

wherein
R=a quaternized 2-thiazolyl radical having the formula

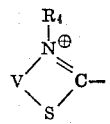

or a quaternized 2-benzothiazolyl radical having the formula

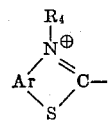

wherein V=vinylene or vinylene substituted with nitro, lower alkyl, lower alkanoyl, cyano, thiocyano, trifluoromethyl, lower alkanoylamido, lower alkylsulfonyl, bromine, lower carboalkoxy, or phenyl;
Ar=o-phenylene or o-phenylene substituted with lower alkyl, lower hydroxyalkyl, lower alkoxy, lower alkanoyl, lower alkanoylamido, halogen, thiocyano, lower alkylthio, lower carboalkoxy, sulfonamido, N - lower alkylsulfonamido, N,N-di-lower alkylsulfonamido, lower alkylsulfonyl, cyano, lower alkylamino, or di-lower alkylamino; and
$R_4$=lower alkyl or benzyl;
$R_1$=p-phenylene or p-phenylene substituted with lower alkyl, lower alkoxy, or halogen;
$R_2$=hydrogen; lower alkyl; lower alkyl substituted with hydroxy, cyano, lower alkoxy, phenoxy, halogen, or lower alkanoyl; or phenyl;
$R_3$=lower alkylene;
Y=ethylene, propylene, vinylene, methylvinylene, 1,2-cyclohexylene, bicyclo[2.2.1] - 5-heptene-2,3-ylene, o-phenylene, nitro-o-phenylene, chloro-o-phenylene, —NHCH$_2$—, —CH$_2$OCH$_2$—, —CH$_2$NHCH$_2$—, or —NHCH$_2$CH$_2$—; and
A=an anion.
2. A compound having the formula

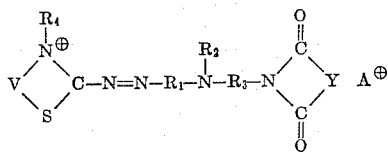

wherein
V=vinylene or vinylene substituted with lower alkyl, thiocyano, lower alkylsulfonyl, or phenyl;
$R_1$=p-phenylene or p-phenylene substituted with lower alkyl, lower alkoxy, or halogen;
$R_2$=lower alkyl or lower alkyl substituted with cyano or hydroxy;
$R_3$=lower alkylene;
$R_4$=lower alkyl;
Y=ethylene, vinylene, o-phenylene, 1,2-cyclohexylene, bicyclo[2.2.1]-5-heptene-2,3-ylene or —NHCH$_2$—; and
A=an anion.

3. A compound according to claim 2 wherein
$R_1$=p-phenylene or p-phenylene substituted with lower alkyl;
$R_2$=lower alkyl;
$R_3$=ethylene;
$R_4$=methyl or ethyl; and
Y=ethylene or o-phenylene.

4. A compound having the formula

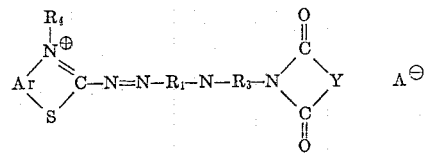

wherein
Ar=o-phenylene or o-phenylene substituted with lower alkyl, lower alkoxy, or halogen;
$R_1$=p-phenylene or p-phenylene substituted with lower alkyl, lower alkoxy, or halogen;
$R_2$=lower alkyl or lower alkyl substituted with cyano or hydroxy;
$R_3$=lower alkylene;
$R_4$=lower alkyl;
Y=ethylene, vinylene, o-phenylene, 1,2-cyclohexylene, or bicyclo[2.2.1]-5-heptene-2,3-ylene; and
A=an anion.

5. A compound according to claim 4 wherein
$R_1$=p-phenylene or p-phenylene substituted with lower alkyl;
$R_2$=lower alkyl;
$R_3$=ethylene;
$R_4$=methyl or ethyl; and
Y=ethylene or o-phenylene.

6. A compound having the general formula

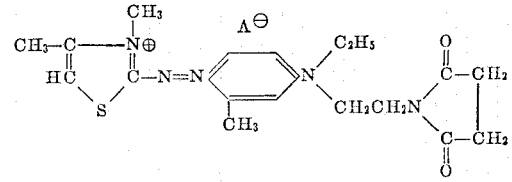

wherein A represents an anion.

7. A compound having the general formula

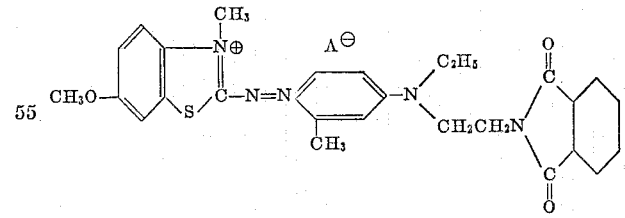

wherein A represents an anion.

8. A compound having the general formula

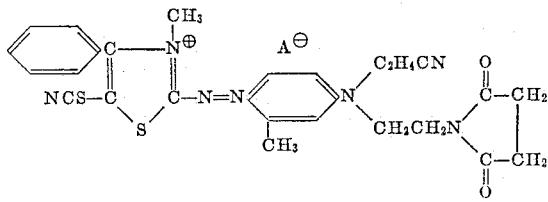

wherein A represents an anion.

9. A compound having the general formula

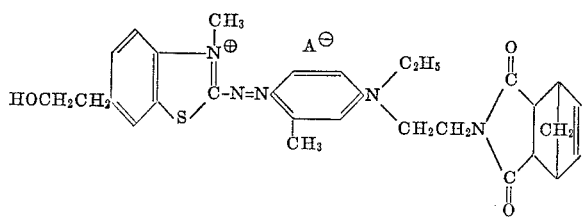

wherein A represents an anion.

10. A compound having the general formula

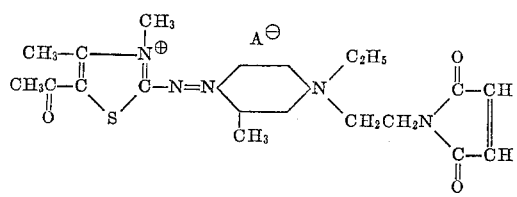

wherein A represents an anion.

11. A compound having the general formula

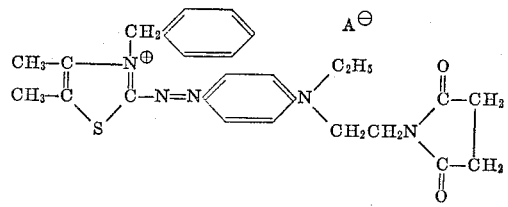

wherein A represents an anion.

References Cited

UNITED STATES PATENTS

| | | |
|---|---|---|
| 2,883,373 | 4/1959 | Bosshard et al. ___ 260—158 XR |
| 2,922,690 | 1/1960 | Mueller et al. ____ 260—158 XR |
| 2,864,812 | 12/1958 | Bosshard et al. ___ 260—158 XR |
| 3,101,988 | 8/1963 | Bosshard et al. ___ 260—158 XR |
| 3,102,878 | 9/1963 | Baumann et al. _____ 260—158 |
| 3,148,180 | 9/1964 | Straley et al. _____ 260—158 |
| 3,161,631 | 12/1964 | Straley et al. _____ 260—158 |

FLOYD D. HIGEL, *Primary Examiner.*